July 28, 1925.

M. G. STEELE

MUSICAL TOY

Filed April 10, 1922

1,547,183

2 Sheets-Sheet 1

Inventor.
Maurice G. Steele.
per
Albert T. St Clair
Attorney.

July 28, 1925.

M. G. STEELE

MUSICAL TOY

Filed April 10, 1922

1,547,183

2 Sheets-Sheet 2

Inventor.
Maurice G. Steele.

per
Albert T. StClair
Attorney.

Patented July 28, 1925.

1,547,183

UNITED STATES PATENT OFFICE.

MAURICE GAYLORD STEELE, OF HARTFORD, CONNECTICUT.

MUSICAL TOY.

Application filed April 10, 1922. Serial No. 551,285.

*To all whom it may concern:*

Be it known that I, MAURICE GAYLORD STEELE, a citizen of the United States, residing at Hartford, in the county of Hartford and State of Connecticut, have invented new and useful Improvements in a Musical Toy, of which the following is a specification.

This invention relates to that class of devices known as musical toys, and more particularly to those musical toys in which means are provided for mechanically playing a predetermined series of notes.

It is an object of this invention to provide a toy by means of which the operator can play a predetermined tune, which may be repeated mechanically as often as desired, and then changed to play any other desired tune.

It is also an object of this invention to provide means for mechanically playing tunes involving notes of varying length.

It is a further object to enable the operator to play chords of any desired number of notes.

It is a still further object to provide a musical toy which will not only be amusing but instructive, to teach the operator the elementary principles of music.

It is another object of this invention to provide means for teaching the operator to associate the sounds of the various notes with their positions on the staff, and the words assigned these notes in the tune being played.

It is a further object to enable the operator to play tunes of his own composition.

Other objects will appear as the description proceeds.

Figure 1:
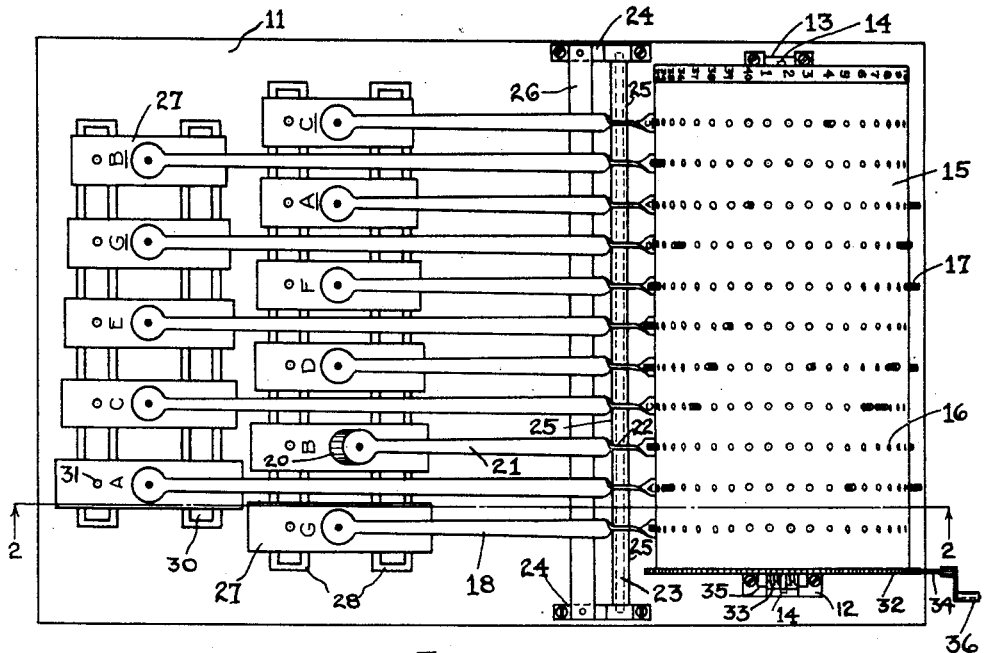
Figure 2:
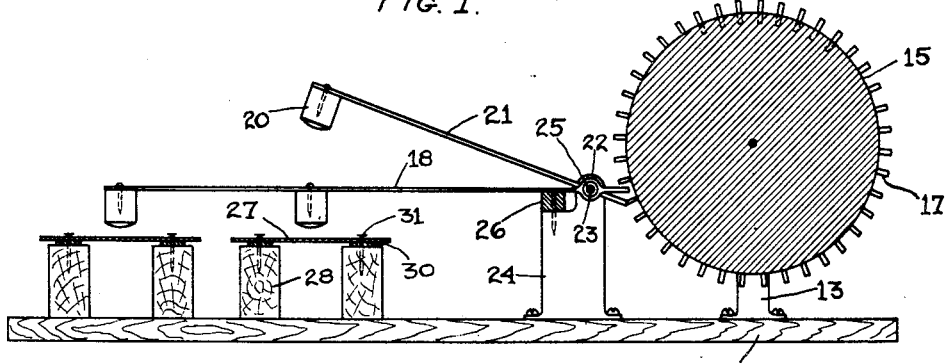
Figure 3:
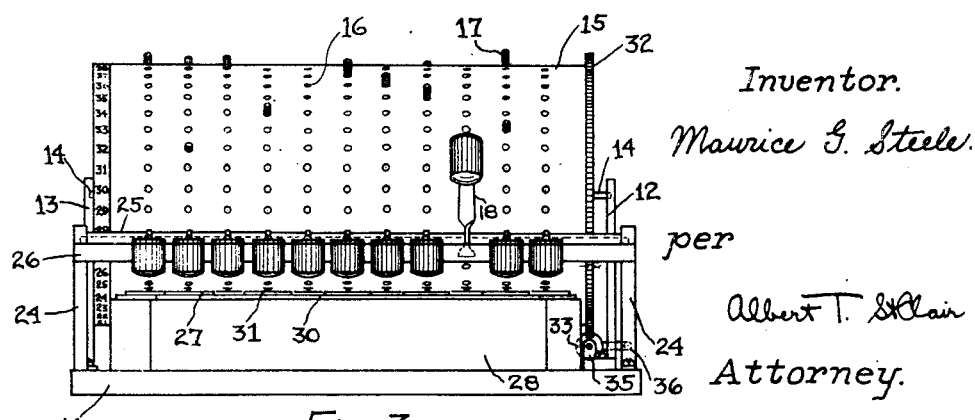
Figure 4:
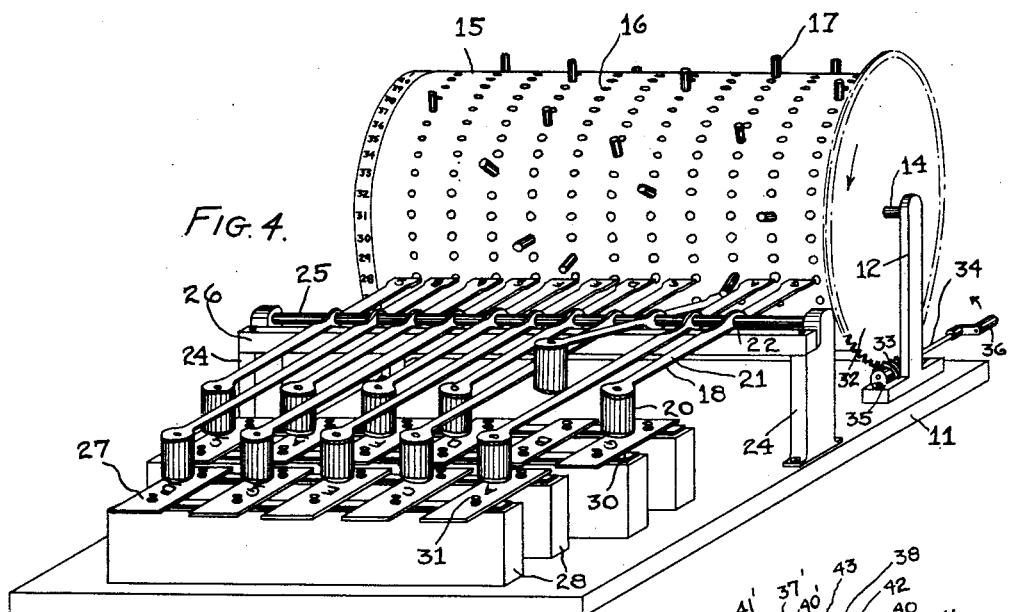
Figure 5:
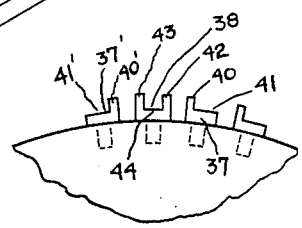
Figure 6:
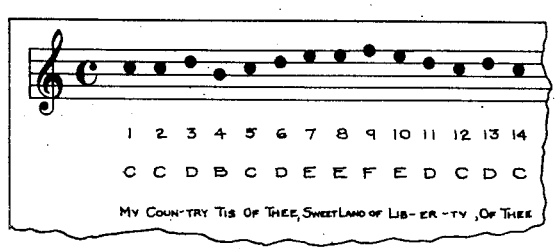
Figure 7:
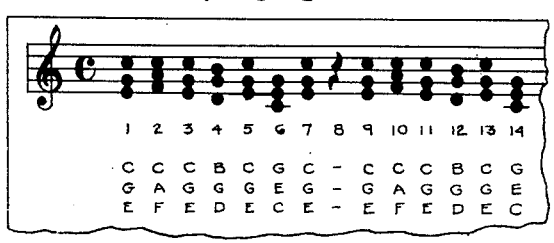
Figure 8:
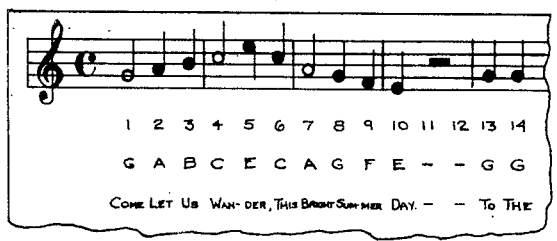

In the accompanying drawings, which show a preferred embodiment of my invention, taken in connection with the following description, Fig. 1 is a plan of my invention; Fig. 2 is a longitudinal vertical section taken on the line 2—2 of Fig. 1; Fig. 3 is a front elevation; Fig. 4 is a perspective view; Fig. 5 is a detail showing various means for controlling the playing of the desired notes; and Figs. 6–8 are fragmentary views of typical charts which serve as guides for the tunes to be played.

The present invention is an improvement in that type of musical toys in which a series of actuating means, such as hammers, are caused to strike a series of note producing means, such as metallic tone plates, and the improvement not only includes the provision of means for actuating said hammers in a predetermined order, but for changing that order at will. This is effected by providing a retaining means, such as a cylinder, with a series of pegs or other devices which are adjustable thereon or removable therefrom, enabling the operator to change the positions of the pegs so as to play the tunes desired. The pegs are preferably arranged in a series of holes in the retaining means, the positions of the holes in one direction being designated by the various notes in the scale, and in another direction by a series of consecutive numbers running from one as high as desired, according to the size of the toy in question. As a guide to the operator, to show him what notes will constitute a given tune, there are provided a series of charts, corresponding to given tunes, each chart having a series of notes arranged in their proper positions on a staff, the successive notes being numbered consecutively and being lettered to correspond with the notes in the musical scale, and also preferably having the words of the tune arranged under the notes.

To prepare the machine for playing a simple tune, the operator merely takes up a peg and places it in the hole in row number one which corresponds with the letter of the first note. A second peg is placed in row number two, corresponding with the letter of the second note, and so on, until all the notes in the given tune have been paralleled with pegs in the retaining means. To operate the machine the operator then rotates the retaining means or peg carrying mechanism, causing the pegs to successively actuate note producing means, and thereby play the tune which has been set up on the toy.

Having briefly indicated the general theory of the present improvement, I will now proceed to its detailed description. Mounted on a suitable bed 11, by a pair of brackets 12, 13, provided with trunnions 14, is a cylinder 15, which has a plurality of parallel rows of holes 16, the intervals between each two consecutive holes in any horizontal row, that is, parallel with the axis of cylinder 15, being equal. The interval between any two consecutive rows is also equal. To control the playing of the desired notes, there is also provided a plurality of pegs or pins 17, which may be arranged in any desired holes in cylinder 15. On the rotation of the cylinder the pegs are caused to engage and actuate a series of hammers 18, one of which will be arranged in line with each circumferential row of holes. Each hammer preferably comprises a head 20 and a lever 21, the latter being of any desired shape and being pivoted at 22 on a rod 23, which is supported in suitable brackets 24 secured to the bed 11. The hammers 18 are separated from each other by a plurality of equal spacing sleeves 25, and the outer hammers are separated from the brackets 24 by other spacing sleeves 25, which may be of any convenient length.

Brackets 24 also support a stop bar 26, which keeps the hammers 18 normally at a slight vertical distance above note producing means, described below. The stop bar also prevents the hammers from striking the note producing means more than once for each actuation of a hammer, and prevents the hammers from damping the tones.

The hammers 18 cooperate with a series of note producing means 27, which may be of any form desired, such as a comb of vibrating music tongues, or strings, bells, or metallic tone plates, the latter being shown herein by way of example. There may be any desired number of note producing means, but for convenience only eleven have been shown herein, extending from G to upper C, the notes of the first octave being designated herein merely by the note letter, whereas the second octave notes are designated by the note letter with a short horizontal line placed therebelow. It will be understood that whatever their form or number, the note producing means will be so chosen that they will correspond in tone with the notes of the musical scale, and there will preferably be at least eight, so a complete octave can be played. Each of the note producing means 27 is mounted on a pair of supports 28, secured to the bed 11, suitable strips of felt 30, or other insulating material, being inserted between the note producing means and the supports, and any convenient means, such as nails 31, being used to hold the note producing means in place. For the sake of convenience and compactness, I prefer to provide two sets of supports 28, the alternate hammers engaging the note producing means on one set of supports, and the remaining hammers those on the other set. For very large toys, in which the note producing means cover a range of two or more octaves, they may be arranged on three or more sets of supports, to avoid making the toy too wide, and the hammers will be arranged accordingly.

For convenience in rotating the cylinder 15, it is provided near one end with a worm wheel 32 which meshes with a worm 33 mounted on a crank shaft 34, the latter being housed in suitable bearings 35 on bracket 12, and having an operating handle 36.

Although there may be as many rows of holes 16 as desired, only forty rows are shown herein, but it will be understood that the number of rows regulates the range of tunes which can be played, as there should be a row for each note in the tune, unless the cycle of notes is repeated. Each row of holes will be numbered consecutively, starting with one, and this may be done in any convenient manner, as by impressing the numbers on the cylinder 15, or by pasting or otherwise securing a strip of paper or other material, bearing the numbers, onto the cylinder. Each note producing means 27, and each lever 21, will preferably bear the letter of the note which it produces.

Having arranged the pegs in the cylinder 15 as indicated above, the operator turns the handle 36, causing worm 33 to rotate the worm wheel 32, and hence the cylinder. This will cause the pegs in the various rows to successively engage the corresponding levers 21 and lift the hammers 18, the hammer corresponding to note B being shown lifted in the figures of the drawing. The continued rotation of the cylinder causes each peg to slide off from its lever, permitting the corresponding hammer to drop and strike the stop bar 26, but the elasticity of the lever, which will preferably be made of some resilient material, such as sheet metal or wire, will permit the hammer to strike its note producing means and cause it to emit its characteristic note. This will be repeated as the handle is turned, until the entire tune has been played, and the latter may be repeated as often as desired by merely turning the handle.

Having played this particular tune as much as desired, the operator can then change the positions of the pegs to play any other desired tune in a similar manner.

If desired, the cylinder 15 may be made removable in any convenient manner, as by making the bracket 13 hinged near the bed 11. The operator can then remove the cylinder, leaving the pegs in position for playing a given tune, thus making what is in effect a record, which is ready to be played at any other time by merely inserting it in position on the trunnions 14 and turning the handle 36. By providing the toy with a plurality of cylinders, the operator can make up a series of records, thus enabling him to rapidly and effectively reproduce these tunes one after another, after the fashion of the ordinary music box. Furthermore, by making the cylinder removable, the operator can remove it to facilitate the insertion of the pegs, thus preventing the partial and irregular playing of the tune which would occur if the cylinder was rotated in its normal operating position while setting up the tune.

It will also be understood that although I have referred to the parts 17 as pegs or pins which are inserted in the holes 16 for the purpose of playing the desired notes, it is within the scope of my invention to substitute therefor any equivalent devices, such as pivoted obstructions or lugs which are left in the cylinder, but are merely swung on their pivots to bring them into position for engaging the desired hammers 18.

In the foregoing description it has been assumed that there would only be one peg in each of the rows of holes parallel with the axis of cylinder 15. This is sufficient when playing simple tunes, such as shown in the chart in Fig. 6. To enable the operator to play chords, however, it is necessary that more than one peg be used, and this is accomplished by using as many pegs in each row as there are notes in the chord. For instance, in the tune shown in the chart in Fig. 7, there are three notes in each chord. To set up this tune, the operator would therefore place three pegs in each row of holes, the positions of the pegs corresponding as before with the notes on the staff, and their positions on the cylinder being located by the operator placing them in the holes which are in line with the hammers bearing letters corresponding with the letters placed below the various notes on the chart. The tune is then reproduced as before by turning the handle 36.

The pegs 17, shown in Figs. 1-4, are substantially cylindrical strips of metal, of equal length and of suitable diameter to fit snugly in the holes 16 when pressed thereinto, but being easily removed therefrom by pulling outwardly thereon. It may sometimes be desirable, however, to make these pegs of other than cylindrical cross section, or of some other material than metal, these being matters of choice or expediency. For instance, they may be tapered from their central portions toward each end to insure a tight fit with the holes. Furthermore, as shown in Fig. 5, the shape of the exposed end of the peg and the distance between successive exposed ends may be used to vary the length of the notes played. The length of any given note will be determined by the interval between the release of a hammer to produce that note and the release of the next hammer, the first note continuing to sound until the next note is struck in the normal playing of the toy, unless a rest is interposed as explained later. By referring to the chart in Fig. 6 it will be seen that all the notes are quarter notes, so that the simple pegs 17, all of which are alike, as shown in Figs. 1-4, are satisfactory. In Fig. 8, however, both half and quarter notes are shown, hence some means of varying the length of the notes played is necessary. In the preferred form of my invention, as shown in Fig. 5, this is accomplished by using multiple lug pegs, e. g. using pegs 37 of one shape to produce notes of one length, and pegs 38 of another shape to produce notes of another length. The exposed portion of peg 37 comprises a lug 40 to constitute the hammer engaging means and a flat portion 41 which is cut away sufficiently to prevent its engagement with the hammer. On the other hand, the exposed portion of peg 38 comprises two lugs 42, 43, to constitute the hammer engaging means, and a cut away portion 44. To produce a half note with peg 37 and two quarter notes with peg 38 the distance from the outer edge of lug 43 to the inner edge of lug 42 should equal the distance from the inner edge of lug 42 to the outer edge of lug 40, and the sum of these distances should equal the distance from the outer edge of lug 40 to the outer edge of the first lug on the next peg. In operation, when the lug 40 releases its hammer there will be the same time interval before the next hammer is released as the sum of the intervals between the release of the hammers by lugs 43 and 42 and before the release by lug 40, the notes struck by lugs 43 and 42 being quarter notes and that struck by lug 40 being a half note. When the two successive quarter notes are the same, a peg 44 will be used, but when they are different, two pegs 37 will be used in the same row, the lugs 40 being turned in opposite directions. An example of a peg turned in the opposite direction is the peg 37' having the lug 40' and cut away portion 41', the only difference between these parts and the parts 37, 40 and 41 being that they are reversed. By similar arrangements of lugs this principle can be applied to the production of eighth notes, sixteenth notes, or any other desired length notes. To aid the operator in telling which kind of peg to use, the latter may be marked with any desired designation, or color, in accordance with the length of note which it produces, and the chart may bear a corresponding designation.

When using multiple lug pegs, as just described, it will usually be found desirable to assign two or more numbers to each horizontal row of holes, these numbers corresponding to lugs or spaces on the pegs. If this change in number is adopted the number below each note on a chart will indicate a lug position on the cylinder instead of indicating a hole position as heretofore.

While the above arrangement of pegs will produce a highly accurate time interval, a less accurate, but still satisfactory time interval, may be produced by merely allowing a longer pause to produce a longer note, and a shorter pause to produce a shorter note, before turning the cylinder far enough to play the next note.

It will be understood that rests, such as shown in the charts in Figs. 7 and 8, may be compensated for by merely omitting the pegs in the rows indicated by the positions of the rests on the charts. For example, when setting up the tune shown in Fig. 7, the operator will not place any pegs in the eighth row, and when setting up the tune shown in Fig. 8 he will not place any pegs in either the eleventh or twelfth rows. When these vacant rows are reached in playing a tune the sound of the previous note will die out naturally since there is nothing to actuate any of the hammers 18, and there will be a pause in the music before the next note is played, the length of this pause depending on the number of rows from which pegs have been omitted.

By providing the toy with a plurality or series of charts, corresponding to any desired tunes, the operator will have a guide for playing a wide range of tunes, and by repeatedly playing any given tune the operator will be able to associate a given note with a given position of the note on the staff, and the letter which designates that note. Furthermore, by associating the given notes with the words under them, the operator will learn the words of the tunes, and these in turn will help him to learn the sounds of the various notes. Having learned the sounds of the latter the operator will be able to play tunes of his own composition, or to pick or peg out popular tunes without the aid of a chart.

It will thus be seen that I have invented a musical toy which is not only fascinating and amusing, but highly instructive, in that it teaches the operator the elementary principles of music, thus bringing this invention into the group of devices known as educational appliances.

While I have herein shown the preferred form of my invention, it is to be understood that it is not limited to the specific embodiment shown herein, nor to the materials, proportions or forms shown, but is susceptible of a wide range of equivalents, which fall within the scope of the appended claims, the broad idea being that by using removable or adjustable pegs or pins a wide variety of tunes may be played mechanically. Furthermore, by the term mechanically I mean to include not only hand operated actuating means, as shown herein, but also various automatic arrangements, such as an electric motor or a spring motor, for operating the actuating means. It is also within the scope of my invention to embody the above principles in a toy piano, in which case the retaining means may be rotated either directly, by the operation of the keys, or indirectly, as by the aid of a spring motor.

I claim:

1. In a musical toy, the combination of note producing means, means for mechanically actuating the note producing means in a given order to play a tune comprising either single notes or chords, or both, and means for mechanically actuating the note producing means in a different order to play any other desired tune.

2. A hammer for striking the note producing means of a musical toy, comprising a strip of resilient material and a non-metallic head, the resilient strip being adapted to receive a pivot and having an enlarged flat terminal portion for engagement by cooperating mechanism.

3. A hammer for striking the note producing means of a musical toy, comprising a strip of metal and a non-metallic head, the metal strip being perforated to receive a pivot and being twisted to present an enlarged flat end for engagement by cooperating mechanism.

4. An educational appliance comprising a musical chart to indicate desired adjustments in a musical toy, in which chart the notes of a tune are arranged in their regular positions on a staff and each note is numbered consecutively.

5. An educational appliance comprising a musical chart to indicate desired adjustments in a musical toy, in which chart the notes of a tune are arranged in their regular positions on a staff and each note is not only numbered consecutively but is also designated by the letter by which it is commonly known in musical practice.

6. An educational appliance comprising a musical chart to indicate desired adjustments in a musical toy, in which chart the notes of a tune are arranged in their regular positions on a staff and the notes are numbered consecutively, and are designated by the letters by which they are commonly known, and by the words assigned the notes in that particular tune.

7. The combination of a musical toy having means for mechanically playing any desired tune thereon, and a chart for use in connection therewith.

8. The combination of a musical toy having means for mechanically playing any desired tunes thereon, and a plurality of charts for use in connection therewith.

9. The combination of a musical toy, comprising a given set of actuators, means for producing a tune therewith, and means for producing any other desired tunes by rearranging the actuators, and guides for facilitating the manual rearrangement of the actuators.

10. The combination of a musical toy, having tune indications thereon, said toy comprising a given set of actuators, means for producing a tune therewith, and means for producing any other desired tunes by rearranging the actuators, and guides for facilitating the rearrangement of the actuators, said guides including a plurality of charts having indications corresponding with similar indications on the toy.

11. The combination of a musical toy, comprising a cylinder, a plurality of adjustable pegs therein, and means for producing a plurality of tunes therewith, and a plurality of charts for indicating the desired adjustments of the pegs to play the various tunes.

12. The combination of a musical toy, comprising a cylinder, a plurality of removable pegs therein, and means for producing a plurality of tunes therewith, and a plurality of charts for indicating the desired positions of the pegs to play the various tunes.

13. An educational appliance comprising a musical chart for indicating the proper positions of manually adjustable pegs in a musical toy, in which chart the notes of a tune are arranged in their regular positions on a staff and each note is numbered consecutively to correspond with similar indications on the toy.

14. The combination of a musical toy having a plurality of manually adjustable pegs for playing tunes thereon, and charts which serve as guides for the manual adjustment of the pegs.

15. The combination of a musical toy, comprising a cylinder, a plurality of adjustable pegs therein, and means for producing a plurality of tunes therewith, and a plurality of charts, which are out of contact with the pegs, for indicating the desired adjustments of the pegs to play the various tunes.

16. In a musical device, the combination of sound producing means, removable actuating means therefor, and a rotatable cylinder containing sets of rows of equally spaced perforations, said rows being placed at right angles to one another, and one set being parallel to and the other set circumferential to the axis of the cylinder, each of said perforations being capable of receiving one of the removable actuating means for actuating the sound producing means which corresponds to the circumferential row of perforations of which it forms a part, and suitable individual indicia applied to the device itself for separately indentifying each parallel and circumferential row so that each perforation may be accurately defined and located.

Signed at Hartford, Conn., this 7th day of April, 1922.

MAURICE GAYLORD STEELE.